(12) United States Patent
Saad et al.

(10) Patent No.: US 11,604,595 B2
(45) Date of Patent: Mar. 14, 2023

(54) DATA MIRRORING AND DATA MIGRATION BETWEEN STORAGE VOLUMES USING SYSTEM CONTROL PROCESSORS

(71) Applicant: Dell Products L.P., Hopkinton, MA (US)

(72) Inventors: Yossef Saad, Gannei Tikva (IL); William Price Dawkins, Austin, TX (US)

(73) Assignee: Dell Products L.P., Hopkinton, MA (US)

( * ) Notice: Subject to any disclaimer, the term of this patent is extended or adjusted under 35 U.S.C. 154(b) by 37 days.

(21) Appl. No.: 17/117,059

(22) Filed: Dec. 9, 2020

(65) Prior Publication Data

US 2022/0179576 A1    Jun. 9, 2022

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0676* (2013.01); *G06F 3/0677* (2013.01); *G06F 3/0679* (2013.01)

(58) Field of Classification Search
CPC ....... G06F 3/0647; G06F 3/065; G06F 3/0604
See application file for complete search history.

(56) References Cited

U.S. PATENT DOCUMENTS

| | | | |
|---|---|---|---|
| 7,478,117 B1 | 1/2009 | Lamb et al. | |
| 7,606,892 B2 | 10/2009 | Piet et al. | |
| 7,620,984 B2 | 11/2009 | Kallahalla | |
| 8,276,140 B1 | 9/2012 | Beda, III et al. | |
| 8,285,747 B1 | 10/2012 | English | |

(Continued)

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Reginald G Bragdon
*Assistant Examiner* — Michael L Westbrook
(74) *Attorney, Agent, or Firm* — Chamberlain, Hrdlicka, White, Williams & Aughtry

(57) ABSTRACT

A method for managing composed information handling systems includes receiving, by a system control processor, a mirroring policy from a system control processor manager, receiving an application write request from a first application instance, based on the application write request and the mirroring policy: initiating servicing of the application write request by a first composed information handling system, initiating servicing of an SCP write request by a second composed information handling system, wherein the SCP write request is based on the application write request, receiving a SCP response from the SCP write request from a second system control processor, wherein a second composed information handling system comprises the second system control processor and is executing a second application instance of the cluster application, and sending a write response to the first application instance, wherein the write response is based, at least in part, on the SCP response.

17 Claims, 17 Drawing Sheets

(56) References Cited

U.S. PATENT DOCUMENTS

| | | | |
|---|---|---|---|
| 8,306,948 B2 | 11/2012 | Chou | |
| 3,499,066 A1 | 7/2013 | Zhang et al. | |
| 8,589,659 B1 | 11/2013 | Shapiro | |
| 3,606,920 A1 | 12/2013 | Gupta et al. | |
| 8,997,242 B2 | 3/2015 | Chen | |
| 9,104,844 B2 | 8/2015 | Fang | |
| 9,105,178 B2 | 8/2015 | Carlson | |
| 9,245,096 B2 | 1/2016 | Abuelsaad | |
| 9,569,598 B2 | 2/2017 | Abuelsaad | |
| 9,613,147 B2 | 4/2017 | Carlson | |
| 9,678,977 B1 | 6/2017 | Aronovich | |
| 9,959,140 B2 | 5/2018 | Jackson | |
| 10,348,574 B2 | 7/2019 | Kulkarni | |
| 10,382,279 B2 | 8/2019 | Roese | |
| 10,601,903 B2 | 3/2020 | Bivens | |
| 10,628,225 B2 | 4/2020 | Yamato | |
| 10,756,990 B1 | 8/2020 | Chakkassery Vidyadharan et al. | |
| 10,782,882 B1 | 9/2020 | Wu | |
| 10,909,283 B1 | 2/2021 | Wang et al. | |
| 10,994,198 B1 | 5/2021 | Byskal et al. | |
| 11,119,739 B1 | 9/2021 | Allen et al. | |
| 11,134,013 B1 | 9/2021 | Allen et al. | |
| 11,221,886 B2 | 1/2022 | Bivens et al. | |
| 2003/0028642 A1 | 2/2003 | Agarwal et al. | |
| 2003/0233427 A1 | 12/2003 | Taguchi | |
| 2004/0257998 A1 | 12/2004 | Chu et al. | |
| 2006/0082222 A1 | 4/2006 | Pincu et al. | |
| 2006/0236100 A1 | 10/2006 | Baskaran et al. | |
| 2008/0052480 A1* | 2/2008 | Satoyama | G06F 11/2082 714/E11.102 |
| 2008/0313476 A1 | 12/2008 | Hansen | |
| 2009/0199193 A1 | 8/2009 | Jackson | |
| 2011/0099147 A1 | 4/2011 | Mcalister et al. | |
| 2011/0154500 A1 | 6/2011 | Sahita et al. | |
| 2011/0307570 A1 | 12/2011 | Speks | |
| 2012/0047328 A1 | 2/2012 | Williams et al. | |
| 2013/0007710 A1 | 1/2013 | Vedula et al. | |
| 2013/0332901 A1 | 12/2013 | Berg et al. | |
| 2013/0346718 A1 | 12/2013 | Meshchaninov et al. | |
| 2014/0007097 A1 | 1/2014 | Chin et al. | |
| 2014/0165063 A1 | 6/2014 | Shiva et al. | |
| 2014/0223233 A1 | 8/2014 | Heyrman et al. | |
| 2014/0282820 A1 | 9/2014 | Walton et al. | |
| 2014/0359356 A1 | 12/2014 | Aoki | |
| 2015/0220455 A1 | 8/2015 | Chen et al. | |
| 2015/0317173 A1 | 11/2015 | Anglin | |
| 2016/0062441 A1 | 3/2016 | Chou et al. | |
| 2016/0180087 A1 | 6/2016 | Edwards et al. | |
| 2016/0259665 A1 | 9/2016 | Gaurav et al. | |
| 2017/0041184 A1 | 2/2017 | Broz et al. | |
| 2017/0097851 A1 | 4/2017 | Chen | |
| 2017/0118247 A1 | 4/2017 | Hussain | |
| 2017/0195201 A1 | 7/2017 | Mueller et al. | |
| 2018/0024964 A1 | 1/2018 | Mao | |
| 2018/0063145 A1 | 3/2018 | Cayton et al. | |
| 2019/0065061 A1 | 2/2019 | Kim et al. | |
| 2019/0065256 A1 | 2/2019 | Hamilton et al. | |
| 2019/0164087 A1 | 5/2019 | Ghibril et al. | |
| 2019/0188014 A1 | 6/2019 | Easterling et al. | |
| 2019/0190778 A1 | 6/2019 | Easterling et al. | |
| 2019/0205180 A1 | 7/2019 | Macha et al. | |
| 2019/0227616 A1 | 7/2019 | Jenne et al. | |
| 2019/0334774 A1 | 10/2019 | Bennett et al. | |
| 2019/0356729 A1 | 11/2019 | Bivens et al. | |
| 2019/0356731 A1 | 11/2019 | Bivens et al. | |
| 2019/0384516 A1 | 12/2019 | Bernat | |
| 2020/0026564 A1 | 1/2020 | Bahramshahry et al. | |
| 2020/0028854 A1 | 1/2020 | Fabrizi et al. | |
| 2020/0044966 A1 | 2/2020 | Krishnan et al. | |
| 2020/0065254 A1 | 2/2020 | Cao et al. | |
| 2020/0174949 A1 | 6/2020 | Ramasamy et al. | |
| 2020/0218561 A1 | 7/2020 | Lal et al. | |
| 2020/0233582 A1* | 7/2020 | Chen | G06F 3/065 |
| 2020/0293375 A1 | 9/2020 | Klein | |
| 2020/0341786 A1 | 10/2020 | Soryal | |
| 2020/0341798 A1 | 10/2020 | Duleba | |
| 2020/0356200 A1 | 11/2020 | Blanco et al. | |
| 2020/0358714 A1 | 11/2020 | Singleton, IV et al. | |
| 2021/0019062 A1 | 1/2021 | Fessel | |
| 2021/0037466 A1 | 2/2021 | Silva et al. | |
| 2021/0111942 A1 | 4/2021 | Tahhan et al. | |
| 2021/0117441 A1 | 4/2021 | Patel et al. | |
| 2021/0152659 A1 | 5/2021 | Cai et al. | |
| 2021/0224093 A1 | 7/2021 | Fu et al. | |
| 2021/0367901 A1 | 11/2021 | Singh et al. | |
| 2021/0397494 A1 | 12/2021 | Graham | |
| 2022/0179701 A1 | 6/2022 | Saad et al. | |
| 2022/0197773 A1 | 6/2022 | Butler et al. | |

OTHER PUBLICATIONS

International Search Report dated Aug. 9, 2021, issued in corresponding PCT Application No. PCT/JS2021/029698 (5 pages).

Written Opinion of the International Searching Authority dated Aug. 9, 2021, issued in corresponding PCT Application No. PCT/US2021/029698 (10 pages).

International Search Report dated Jul. 19, 2021, issued in corresponding PCT Application No. PCT/US2021/029687 (2 pages).

Written Opinion of the International Searching Authority dated Jul. 19, 2021, issued in corresponding PCT Application No. PCT/US2021/029687 (9 pages).

International Search Report dated Oct. 21, 2021, issued in corresponding PCT Application No. PCT/JS2021/029708 (5 pages).

Written Opinion of the International Searching Authority dated Oct. 21, 2021, issued in corresponding PCT Application No. PCT/US2021/029708 (7 pages).

International Search Report dated Aug. 19, 2021, issued in corresponding PCT Application No. PCT/US2021/029702 (5 pages).

Written Opinion of the International Searching Authority dated Aug. 19, 2021, issued in corresponding PCT Application No. PCT/US2021/029702 (8 pages).

Alachiotis, Nikolaos, et al. "dReDBox: A disaggregated architectural perspective for data centers." Hardware Accelerators in Data Centers. Springer, Cham, 2019. pp. 35-56. (Year: 2019) (22 pages).

* cited by examiner

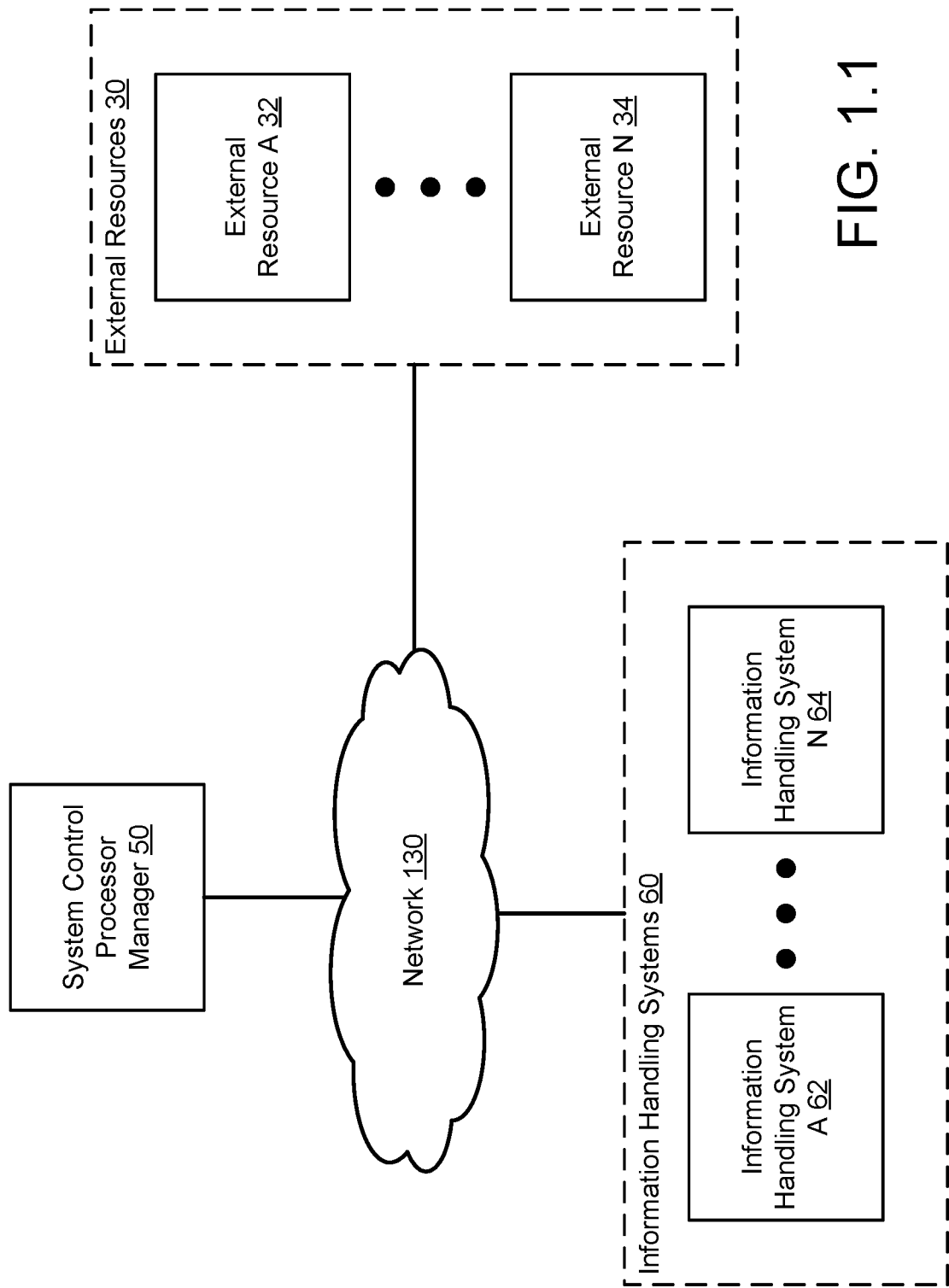
FIG. 1.1

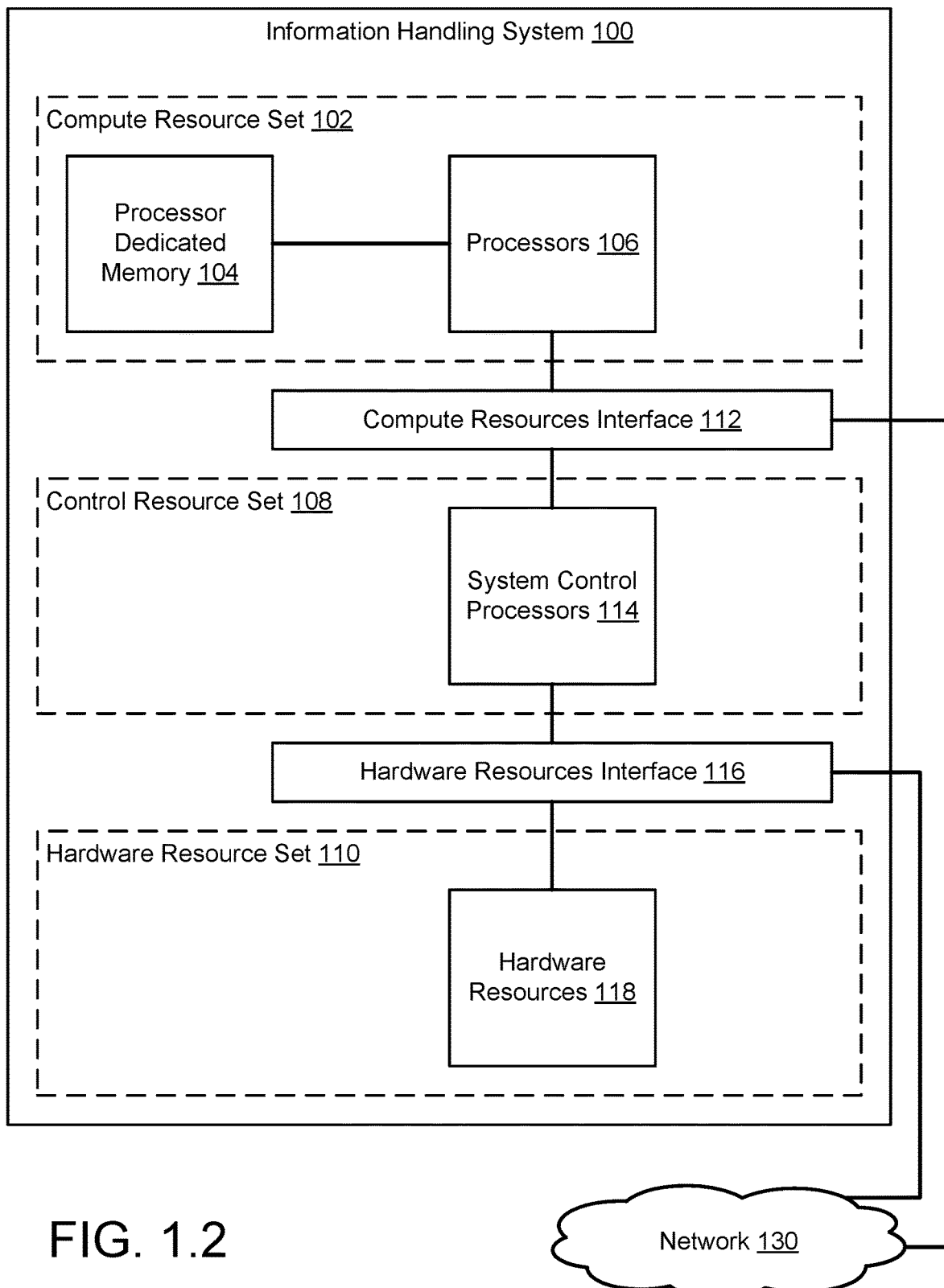
FIG. 1.2

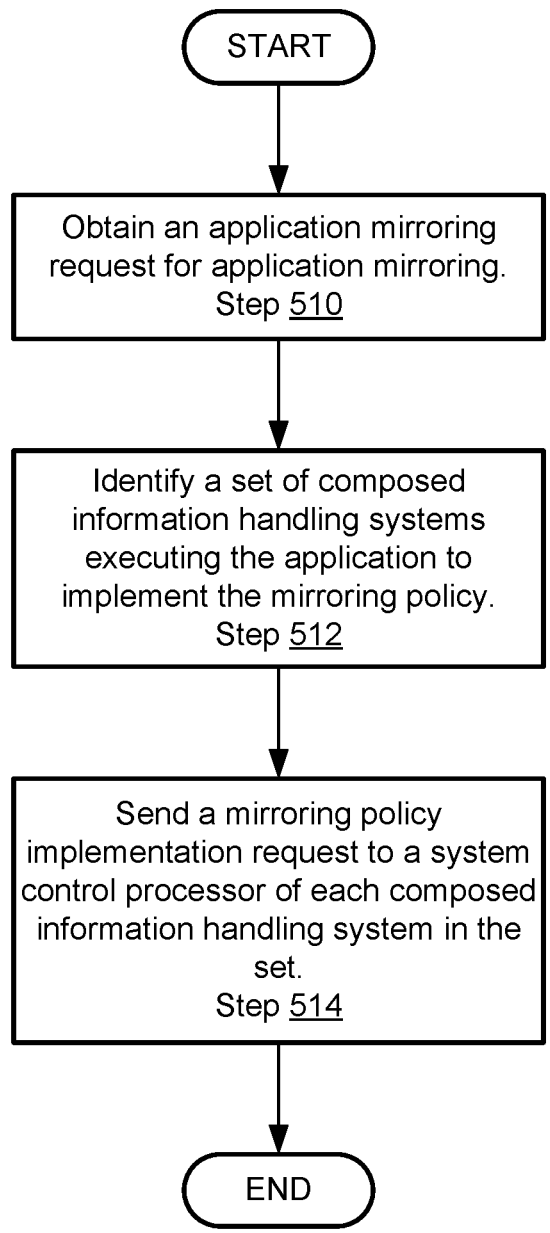
FIG. 5.1

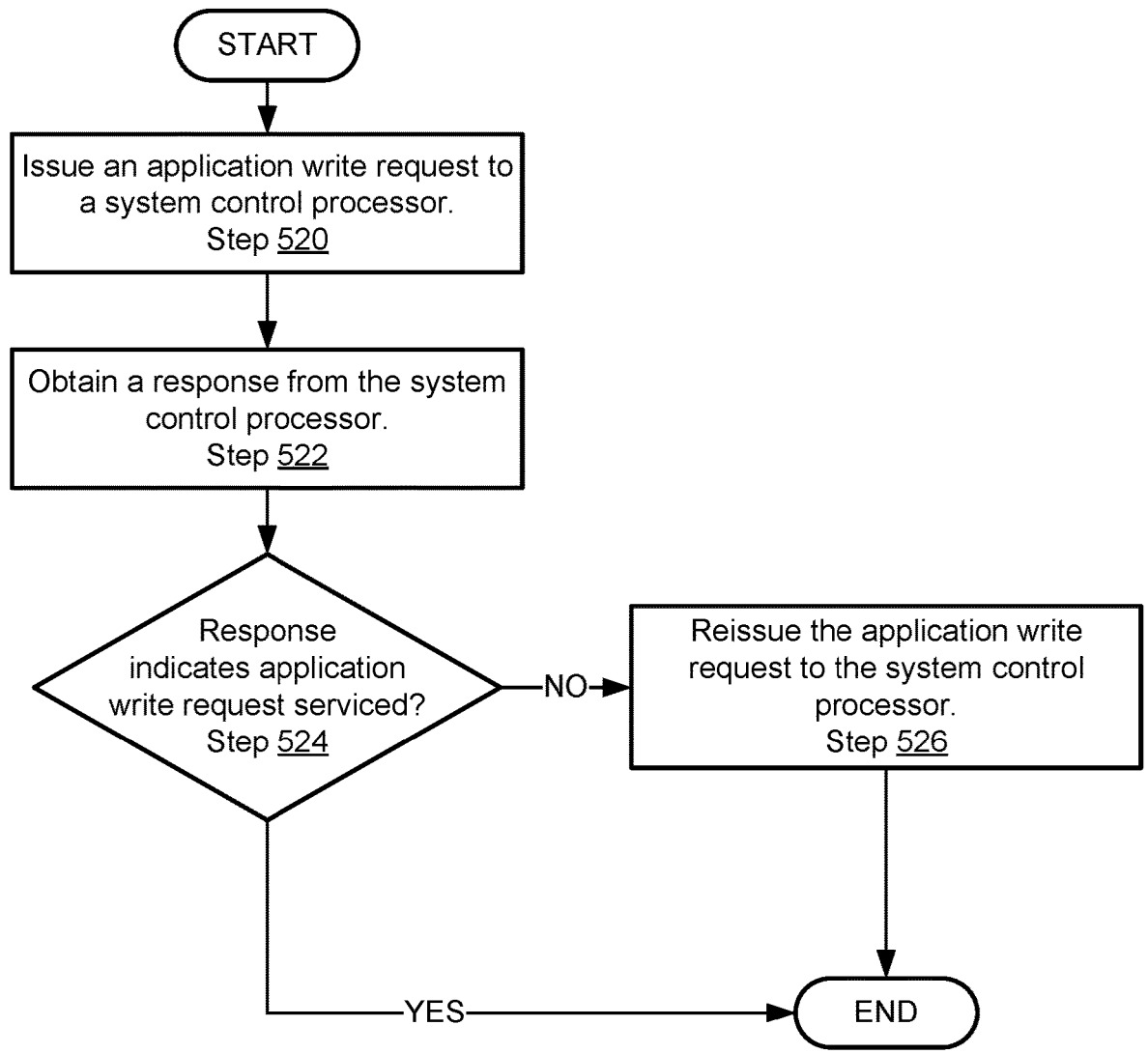
FIG. 5.2

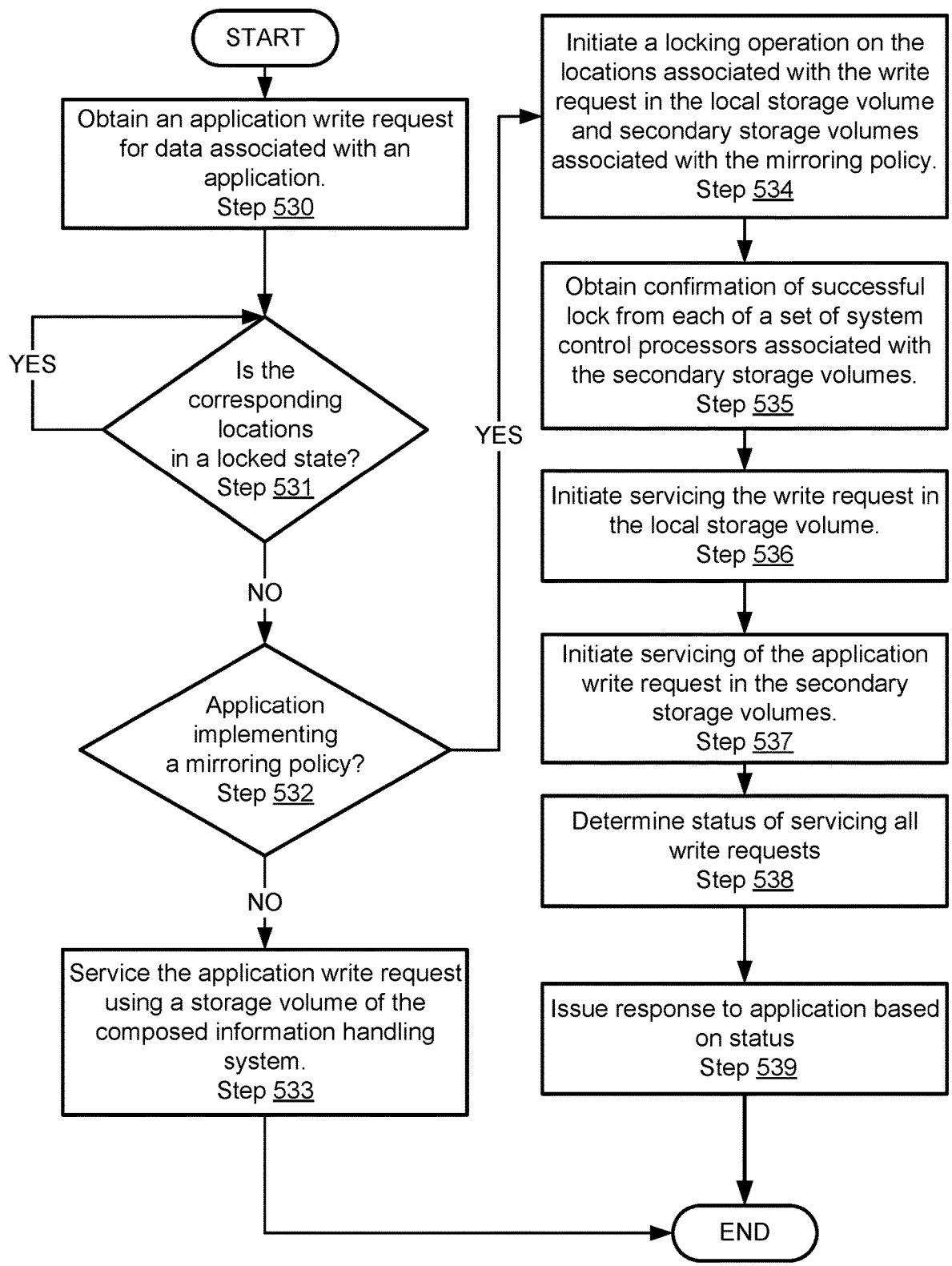
FIG. 5.3

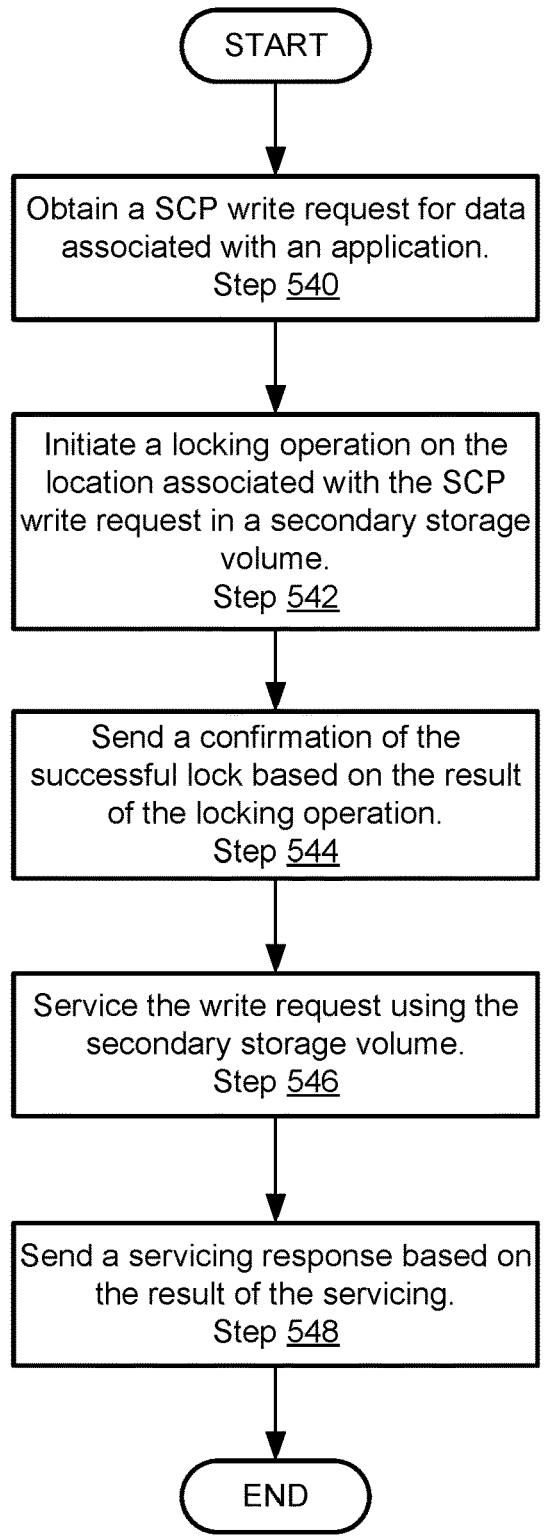
FIG. 5.4

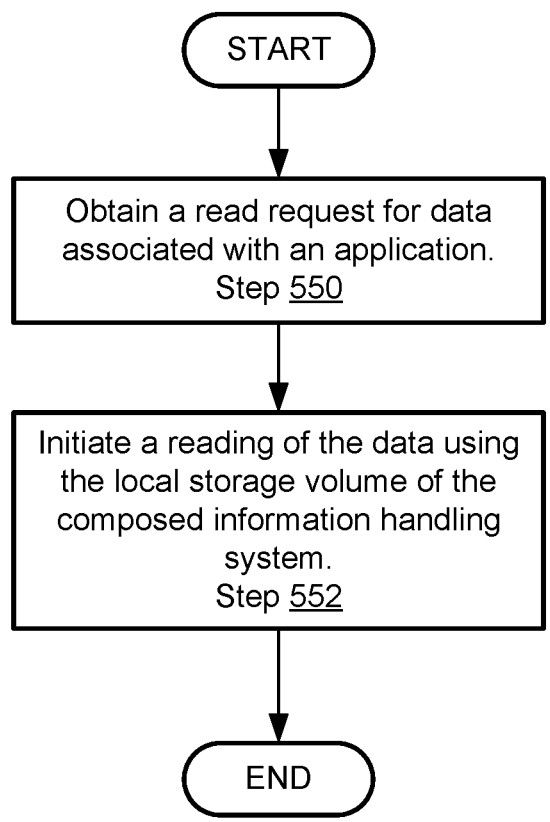
FIG. 5.5

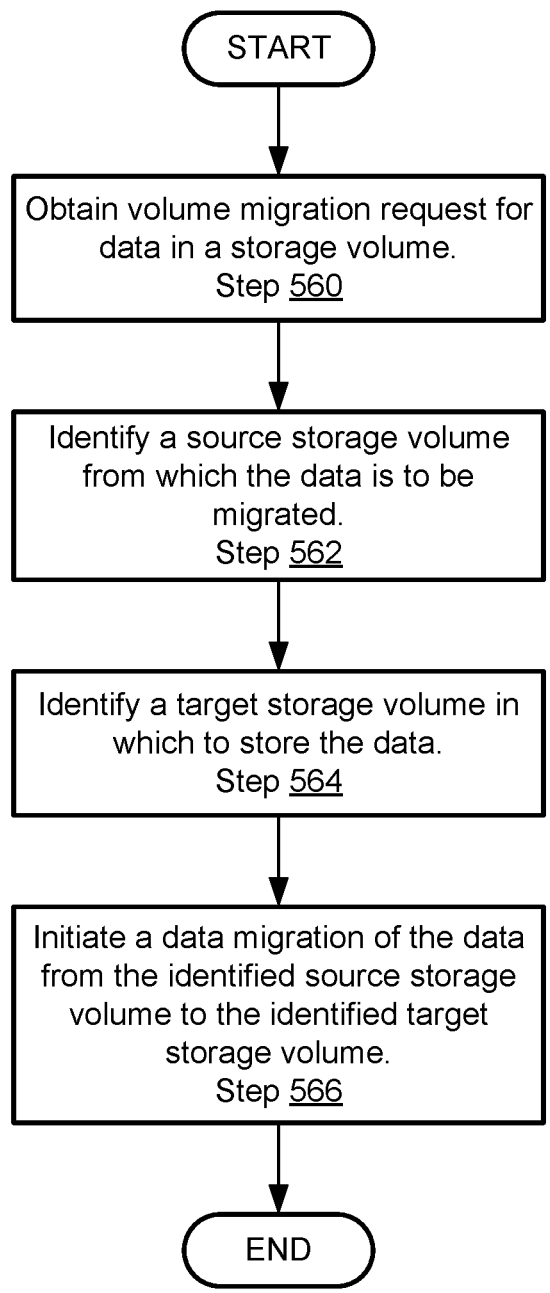
FIG. 5.6

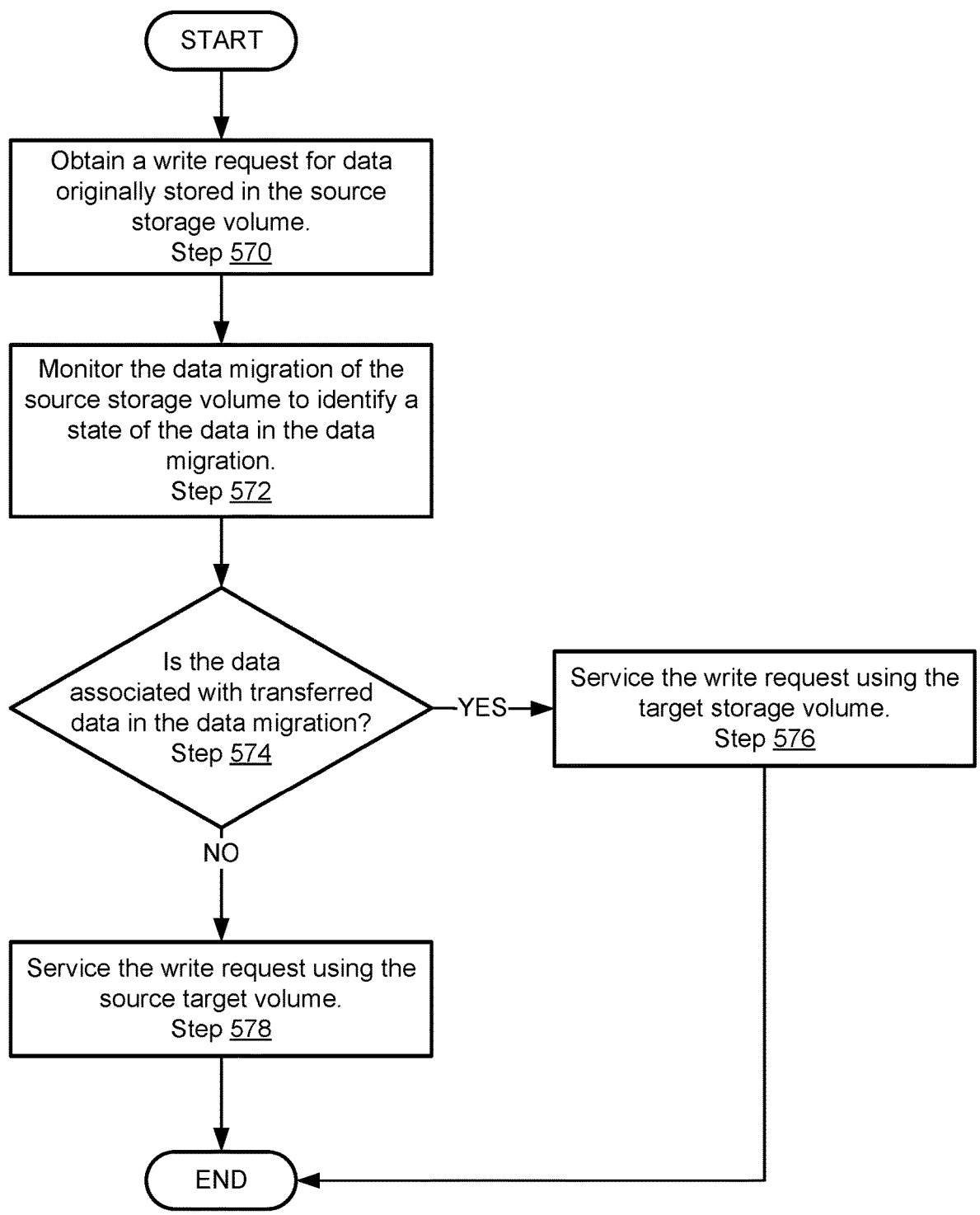
FIG. 5.7

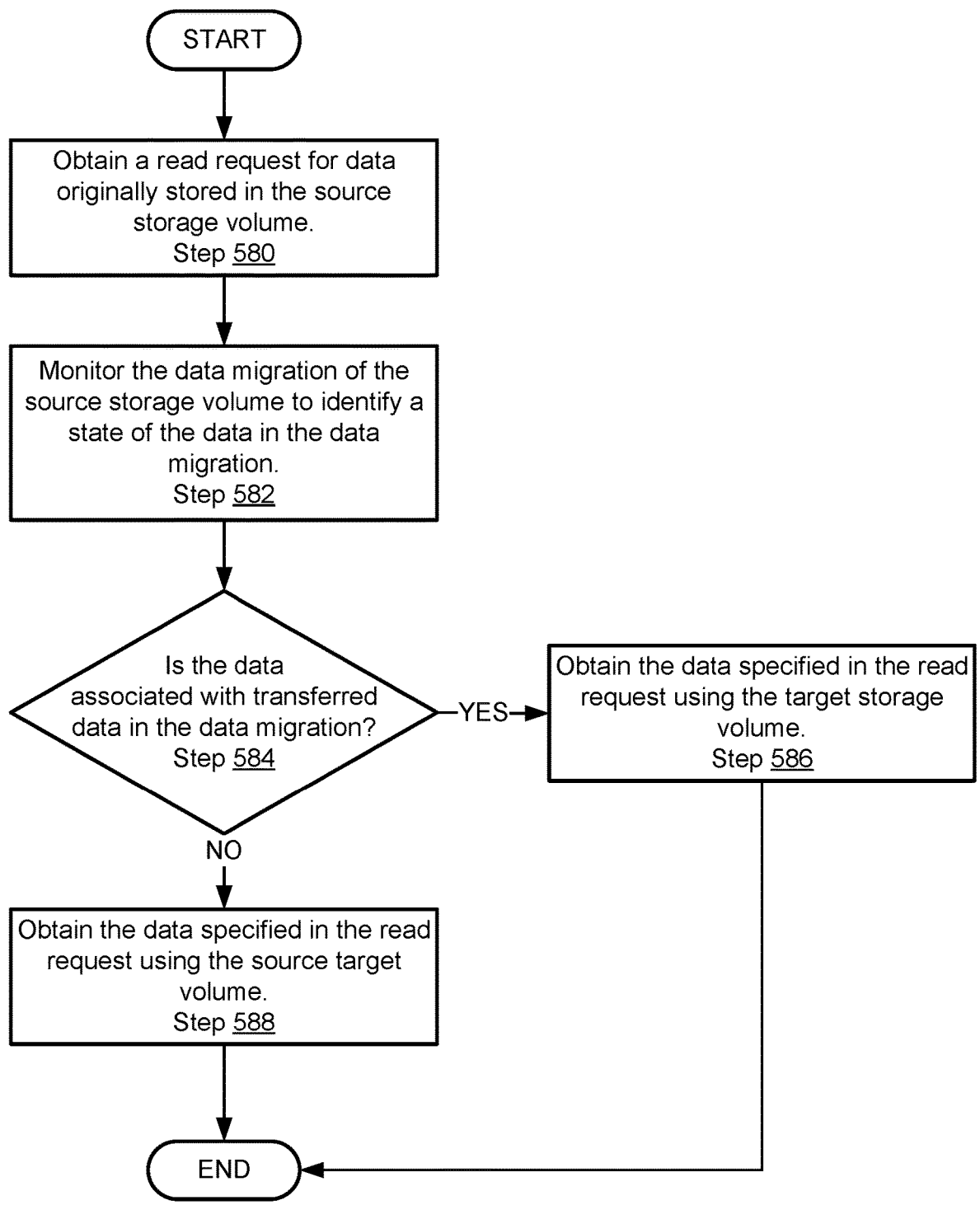
FIG. 5.8

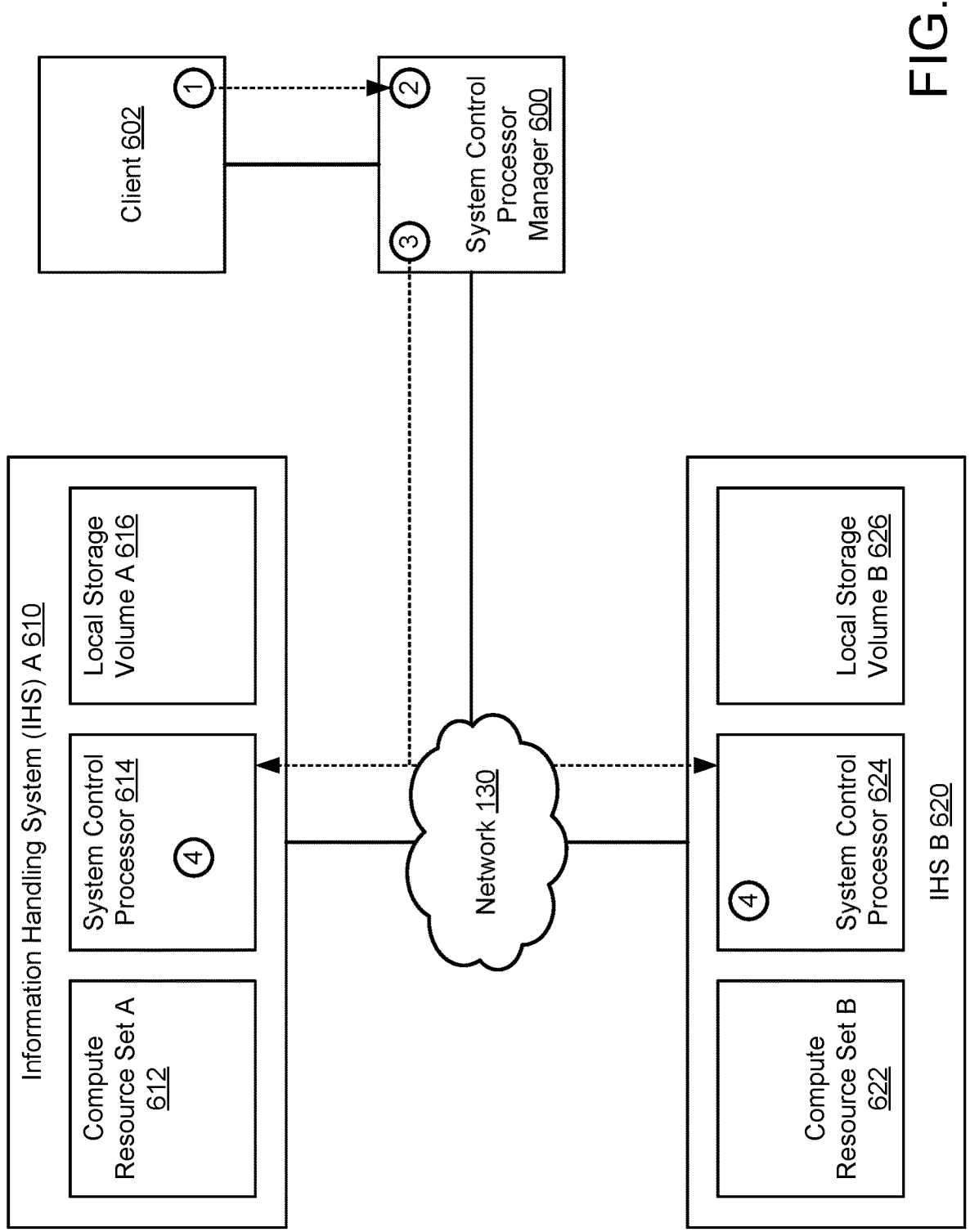
FIG. 6.1

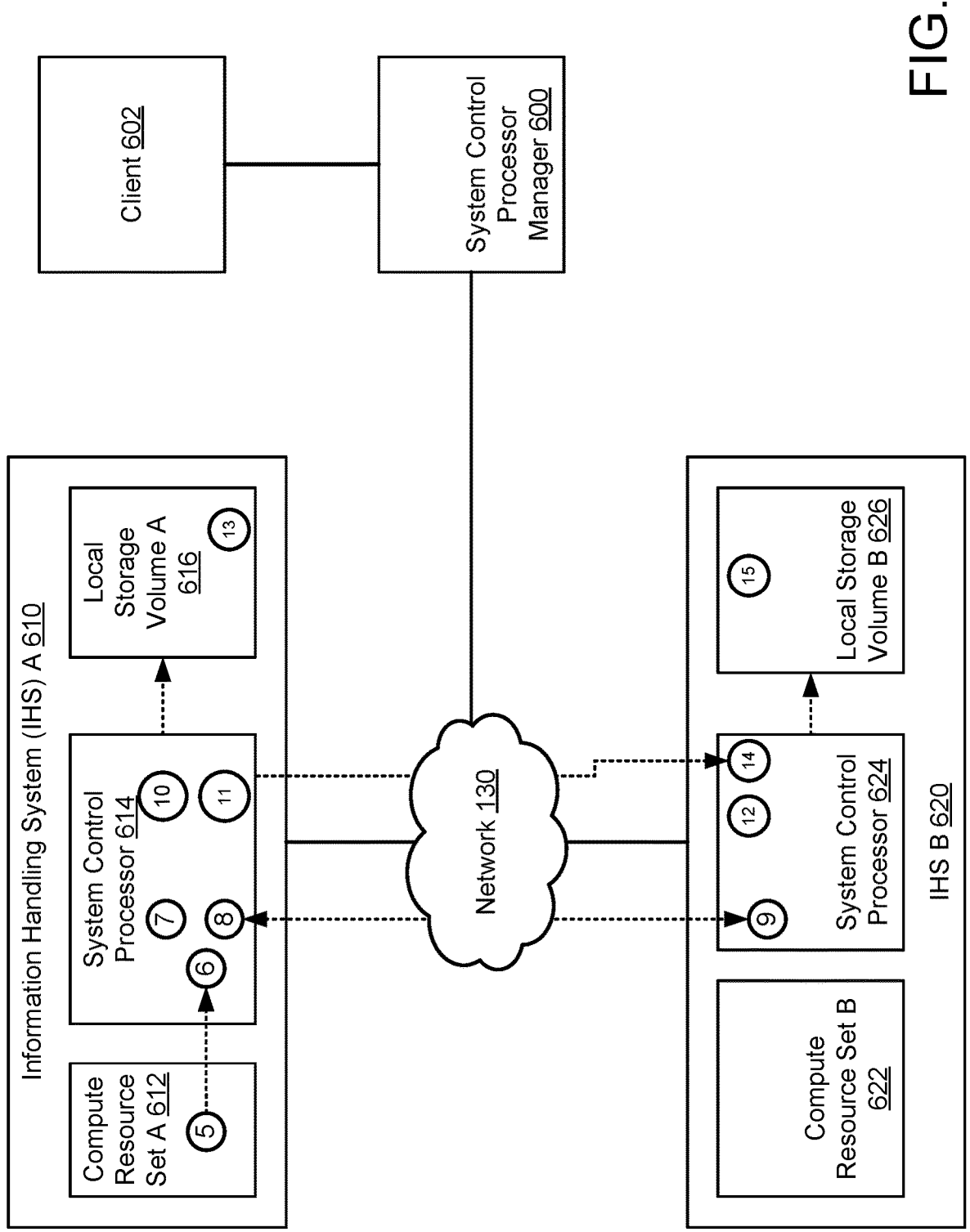
FIG. 6.2

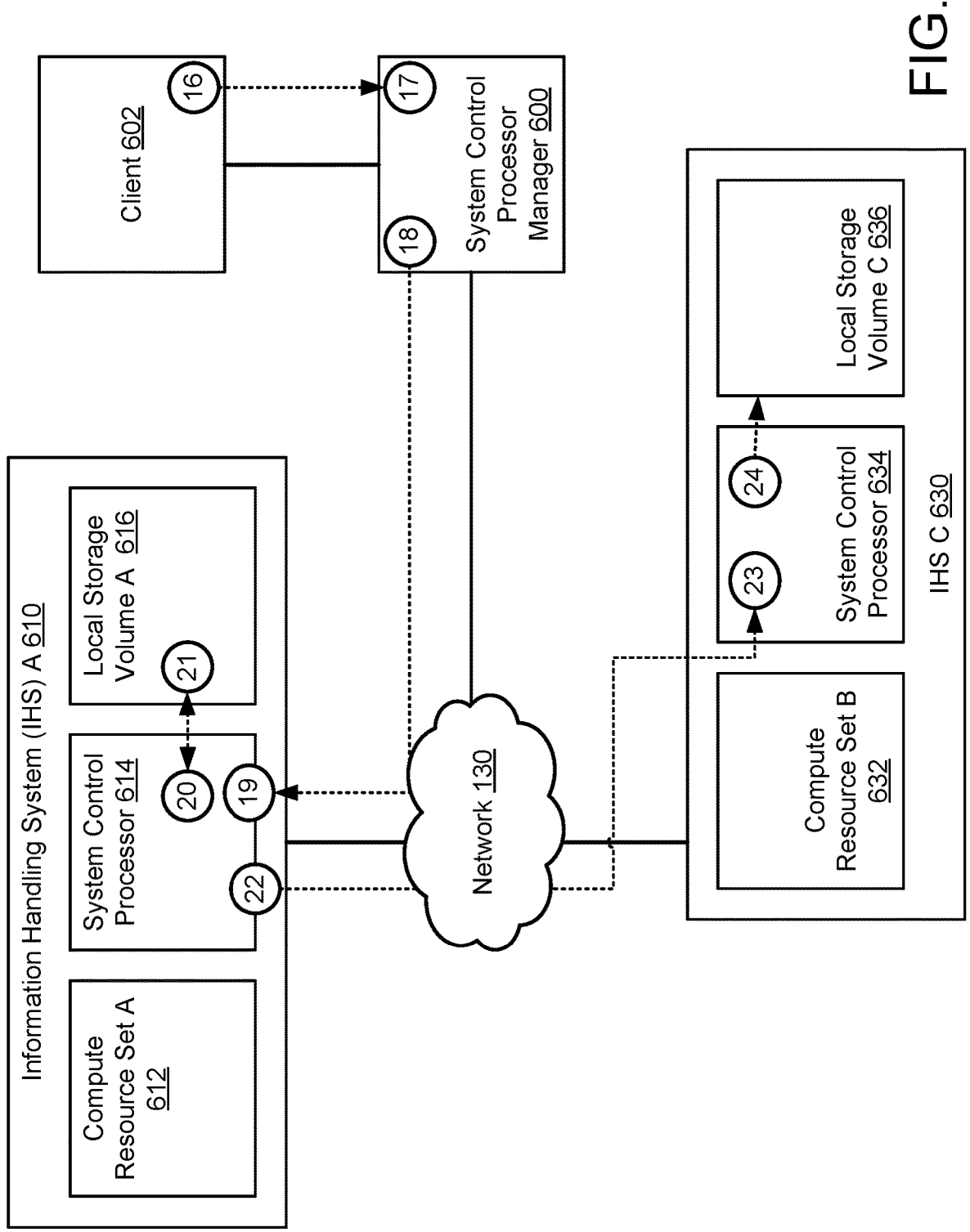
FIG. 6.3

DATA MIRRORING AND DATA MIGRATION BETWEEN STORAGE VOLUMES USING SYSTEM CONTROL PROCESSORS

BACKGROUND

Computing devices may provide services. To provide the services, the computing devices may include hardware components and software components. The services provided by the computing devices may be limited by these components.

SUMMARY

In general, in one aspect, the invention relates to a system that includes a first composed information handling system comprising a system control processor and that provides, at least in part, the computer implemented services, wherein the computer implemented services comprises executing a first application instance of a cluster application, wherein the system control processor is programmed to: receive a mirroring policy from a system control processor manager, receive an application write request from the first application instance, based on the application write request and the mirroring policy: initiate servicing of the application write request by the first composed information handling system, initiate servicing of an SCP write request by a second composed information handling system, wherein the SCP write request is based on the application write request, receive an SCP response from the SCP write request from a second system control processor, wherein a second composed information handling system comprises the second system control processor and is executing a second application instance of the cluster application, and send a write response to the first application instance, wherein the write response is based, at least in part, on the SCP response.

In general, in one aspect, the invention relates to a method for providing computer implemented services using information handling systems. The method includes receiving, by a system control processor, a mirroring policy from a system control processor manager, receiving an application write request from a first application instance, based on the application write request and the mirroring policy: initiating servicing of the application write request by a first composed information handling system, initiating servicing of an SCP write request by a second composed information handling system, wherein the SCP write request is based on the application write request, wherein the first composed information handling system comprises the system control processor and provides the computer implemented services, and wherein the computer implemented services comprises executing the first application instance of a cluster application, receiving a SCP response from the SCP write request from a second system control processor, wherein a second composed information handling system comprises the second system control processor and is executing a second application instance of the cluster application, and sending a write response to the first application instance, wherein the write response is based, at least in part, on the SCP response.

In general, in one aspect, the invention relates to a non-transitory computer readable medium that includes computer readable program code, which when executed by a computer processor enables the computer processor to perform a method for dynamically instantiating composed information handling systems. The method includes receiving, by a system control processor, a mirroring policy from a system control processor manager, receiving an application write request from a first application instance, based on the application write request and the mirroring policy: initiating servicing of the application write request by a first composed information handling system, initiating servicing of an SCP write request by a second composed information handling system, wherein the SCP write request is based on the application write request, wherein the first composed information handling system comprises the system control processor and provides the computer implemented services, and wherein the computer implemented services comprises executing the first application instance of a cluster application, receiving a SCP response from the SCP write request from a second system control processor, wherein a second composed information handling system comprises the second system control processor and is executing a second application instance of the cluster application, and sending a write response to the first application instance, wherein the write response is based, at least in part, on the SCP response.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of initiating application mirroring in accordance with one or more embodiments of the invention.

FIG. 5.2 shows a flowchart of a method of issuing application write requests in accordance with one or more embodiments of the invention.

FIG. 5.3 shows a flowchart of a method of servicing application write requests in accordance with one or more embodiments of the invention.

FIG. 5.4 shows a flowchart of a method of servicing SCP write requests in accordance with one or more embodiments of the invention.

FIG. 5.5 shows a flowchart of a method of servicing read requests in accordance with one or more embodiments of the invention.

FIG. 5.6 shows a flowchart of a method of initiating a data migration in accordance with one or more embodiments of the invention.

FIG. 5.7 shows a flowchart of a method of servicing write requests during a data migration in accordance with one or more embodiments of the invention.

FIG. 5.8 shows a flowchart of a method of servicing read requests during a data migration in accordance with one or more embodiments of the invention.

FIGS. 6.1-6.3 shows diagrams of the operation of an example system over time in accordance with one or more embodiments of the invention.

DETAILED DESCRIPTION

Figure 2:
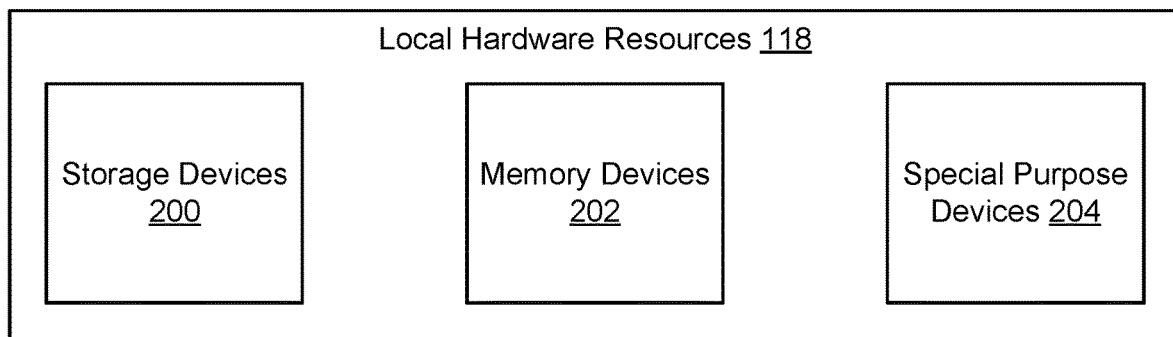
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more application, providing of our or more services, etc. The system control processor manager may translate the composition requests into corresponding quantities of computing resources necessary to be allocated to satisfy the intent of the composition requests.

Once the quantities of computing resources are obtained, the system control processor manager may allocate resources of the information handling system to meet the identified quantities of computing resources by instructing system control processors of the information handling systems to prepare and present hardware resources sets of the information handling system to compute resource sets of the information handling systems.

Additionally, the system control processor manager may include functionality for managing mirroring policies for application instances executing on multiple composed information handling systems. The mirroring policies may specify mirroring writes issued by one application instance across secondary storage volumes in a set of the multiple composed information handling systems.

The system control processors (SCPs) of each of the multiple composed information handling system implementing the application mirroring policy may service application write requests by initiating locking operations on the locations of the data associated with the application write request, sending SCP write requests to each system control processor in the set, obtaining confirmations based on the servicing of the SCP write requests, locally servicing the application write request, and sending a response to the application instance in response to the servicing of both the application write request and the SCP write requests.

Further, embodiments of the invention enable the system control processor manager to initiate data migration of data between storage volumes in a composed information handling system in a manner that is transparent to applications executing on the composed information handling system and the users of composed information handling system. Further, a system control processor may include functionality that enables servicing read and write requests of data during the data migration. This may reduce any interruption of the operation of the composed information handling system that may be initiated by the data migration.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 22) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

In general, embodiments of the invention relate to system, methods, and devices for managing the hardware resources of the information handling systems (22) and/or other resources (e.g., external resources (30)) to provide computer implemented services. The hardware resources of the information handling systems (22) may be managed by instantiating one or more composed information handling systems using the hardware resources of the information handling systems (22), external resources (30), and/or other types of hardware devices operably connected to the information handling systems (22). Consequently, the computing resources allocated to a composed information handling system may be tailored to the specific needs of the services that will be provided by the composed information handling system.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three-resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three-resource set model.

By logically dividing the computing resources of an information handling system into these resource sets, different quantities and types of computing resource may be allocated to each composed information handling system thereby enabling the resources allocated to the respective information handling system to match performed workloads.

Further, dividing the computing resources in accordance with the three-resource set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three-resource set model. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1 and 5.6. The system control processor manager (50), information handling systems (60), and/or external resources (30) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 20) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114).

The system control processors (114) of the hardware resource set (110) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (120).

In an additional example, the system control processors (114) may be operably connected to external resources via hardware resources interface (116) and network (130). The system control processors (114) may prepare and present the external resources as bare metal resources to the compute resource set (120).

Figure 3:
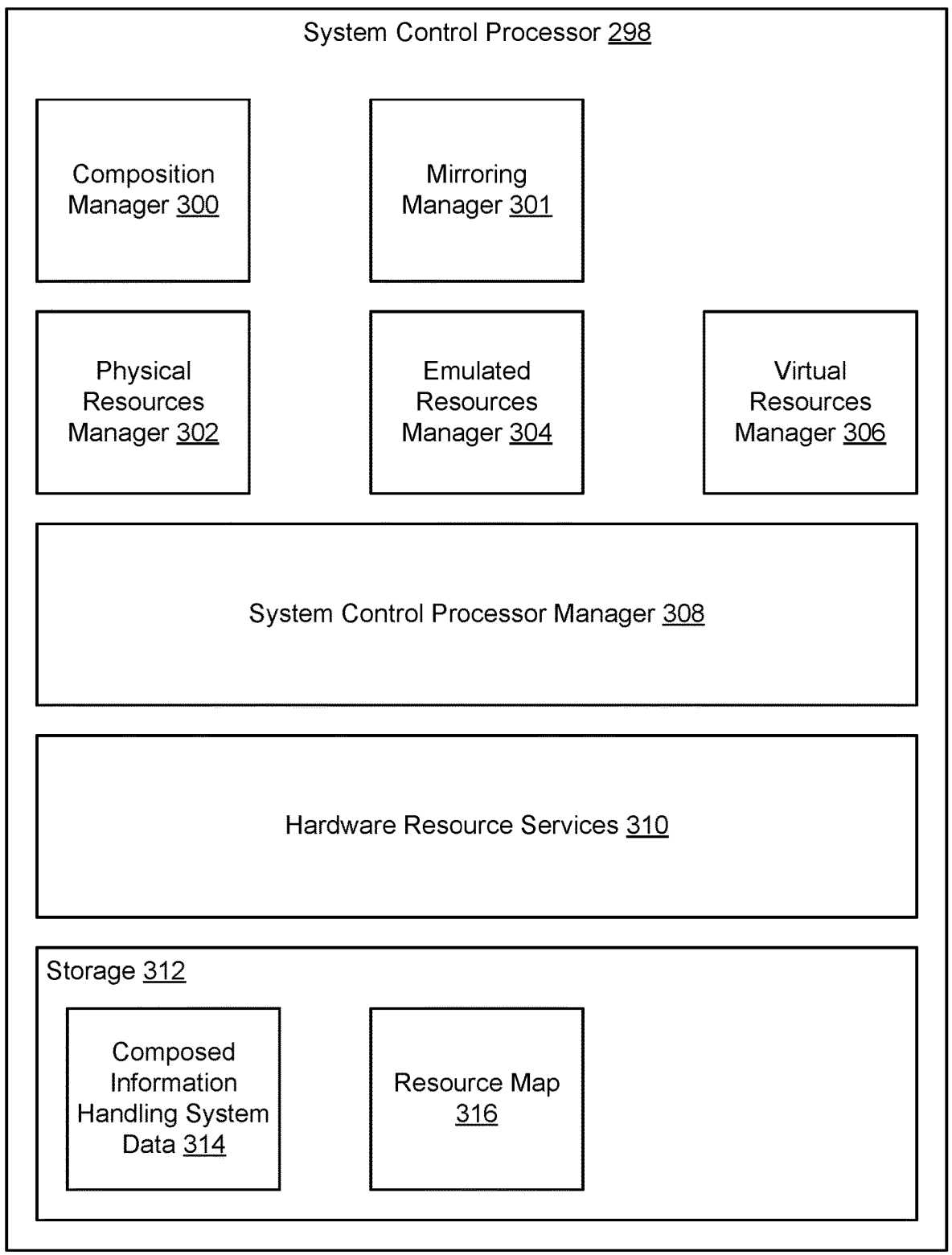
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (120), control resource set (108), and/or hardware resource set (110) may be implemented as separate physical devices. In such as scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.8. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may instantiate redundant performance of workloads for high availability services.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services.

To instantiate and operate composed information handling systems, the system control processor (298) may include a composition manager (300), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) manage the operation of the composed information handling systems by, for example, duplicating performance of workloads to improve the likelihood that the output of workloads are available, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent-based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The mirroring manager (301) may manage and/or implement mirroring policies obtained from the system control processor manager. In one or more embodiments of the invention, a mirroring policy is a policy that specifies mirroring data generated from an application instance of a cluster application executed by a compute resource set of a composed information handling system managed by the system control processor (298). In one or more embodiments of the invention, the cluster application is an application executed by multiple composed information handling systems. Each composed information handling system may execute an application instance of the cluster application. Further, each composed information handling system may manage virtual addresses that are identical for each composed information handling system. The virtual addresses may specify virtual locations in which the application data is stored. The mirroring policies may be implemented in accordance with at least a portion of the methods illustrated in FIGS. 5.3 and 5.4.

The mirroring manager (301) may further include functionality for managing data migrations between storage volumes in a composed information handling systems. In one or more embodiments of the invention, the data migration is a process for transferring data from one source storage volume to a target storage volume. During the data migration, read and write requests may still be serviced. The data may be migrated, written to, and/or read from in accordance with FIGS. 5.6-5.8.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via a pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, methods illustrated in FIGS. 5.1-5.8.

The system control processor (298) may be implemented using computing devices. The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.8. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), operation manager (308), and/or hardware resource services (310). The composition manager (300), physical resources manager (302), emulated resources manager (304), virtual resources manager (306), operation manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
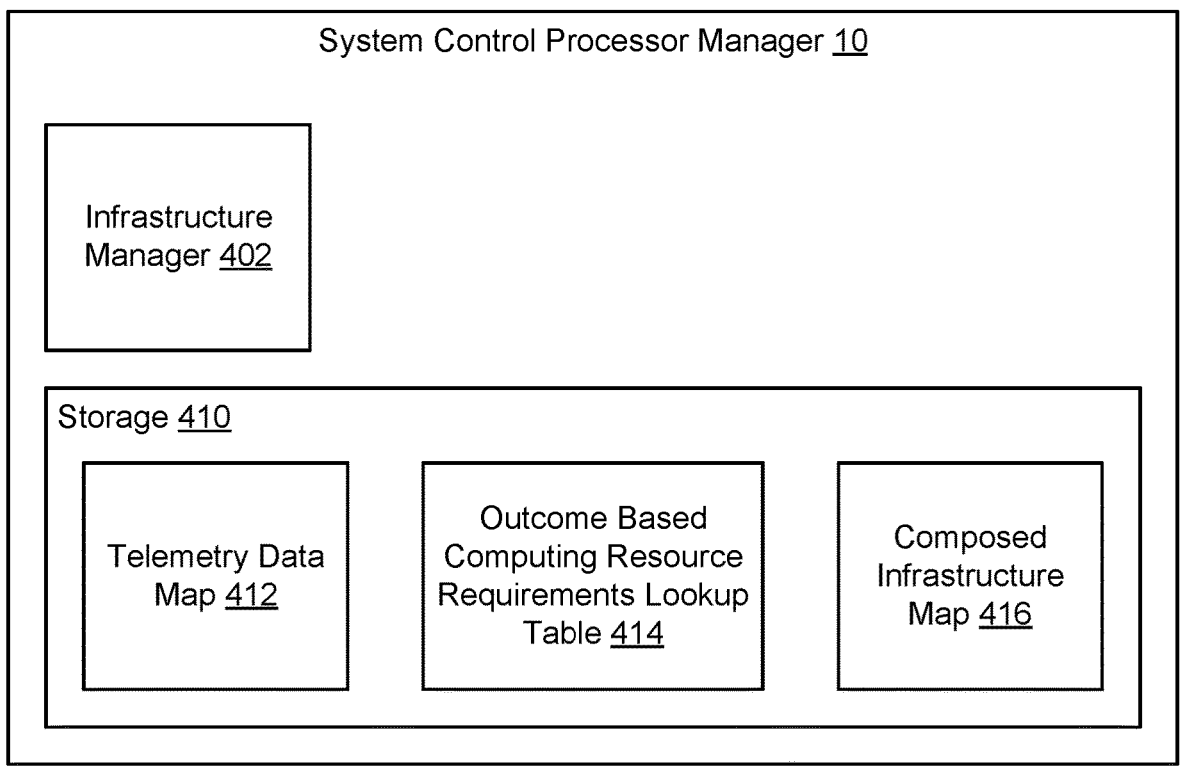
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent-based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402 may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1 and 5.6.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome-based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.8 show methods that may be performed by components of the system of FIG. 1.1 to manage composed information handling systems.

FIG. 5.1 shows a flowchart of a method in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

Turning to FIG. 5.1, in step 510, an application mirroring request for application mirroring is obtained. In one or more embodiments of the invention, the application mirroring request specifies implementing a mirroring policy between two or more application instances of a cluster application executing across multiple composed information handling services.

In step 512, a set of composed information handling systems executing the application instances is identified to implement the mirroring policy. In one or more embodiments of the invention, the set of composed information handling systems are identified using a telemetry data map that tracks the composed information handling systems managed by the system control processor manager. The telemetry data map may specify which composed information handling systems are executing an application instance associated with the specified cluster application.

In step 514, a mirroring policy implementation request is sent to a system control processor of each composed information handling system in the set. In one or more embodiments of the invention, the mirroring policy implementation request specifies implementing the mirroring policy. The mirroring policy may specify the set (or subset) of composed information handling system that are executing an application instance of the application.

The mirroring policy may further specify sending, by a system control processor servicing application write requests, SCP write requests to each system control processor of the set (or subset) of composed information handling systems to write data associated with the application write request.

In one or more embodiments of the invention, the SCPs implement the mirroring policy by assigning states to mirrored storage addresses (e.g., to storage addresses storing application data to be mirrored) such that, when a read or write request is issued to the mirror storage addresses, the requests are serviced in accordance with, e.g., FIGS. 5.3-5.5.

FIG. 5.2 shows a flowchart of a method in accordance with one or more embodiments of the invention. The method shown in FIG. 5.2 may be performed by, for example, an application instance executing on a compute resource set (e.g., 102, FIG. 1.2). Other components of the system in FIGS. 1.1-3 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

Turning to FIG. 5.2, in step 520, an application write request is issued to a system control processor by an application instance executing on a composed information handling system, where the system control processor is part of the composed information handling system. In one or more embodiments of the invention, the application write request specifies writing data to a location managed by the system control processor. The data may be application data, e.g., data generated by the application instance of the application executing on the composed information handling system of the system control processor.

In step 522, a response is obtained from the system control processor. The response may be a message that specifies whether the application write request is serviced according to the system control processor. Alternatively, the response may specify that the application write request was not serviced by the system control processor.

In step 524, a determination is made about whether the response indicates that the application request is serviced. If the response indicates that the application write request is serviced, the method ends following step 524; otherwise, the method proceeds to step 526.

In step 526, the application write request is reissued to the system control processor. The application write request may be resent to the system control processor. Alternatively, the reissued application write request may be sent to a second system control processor (if available) in the composed information handling system.

FIG. 5.3 shows a flowchart of a method in accordance with one or more embodiments of the invention. The method shown in FIG. 5.3 may be performed by, for example, a system control processor (e.g., 114, FIG. 1.2). Other components of the system in FIGS. 1.1-4 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

Turning to FIG. 5.3, in step 530, an application write request for data associated with an application is obtained. In one or more embodiments of the invention, the application write request may be the application write request discussed in FIG. 5.2. Specifically, the application write request may be the application write request issued in steps 520 or 526 of FIG. 5.2.

In step 531, a determination is made about whether a location corresponding to the write request is in a locked state. In one or more embodiments of the invention, the determination is made using a locking data structure maintained by the system control processor. The locking data structure may specify whether a location of the data specified in the application write request is in a locked state.

In one or more embodiments of the invention, the location is a virtual address. The system control processor may maintain a translation table that maps the virtual address to a physical address of a storage device of the composed information handling system.

In one embodiment of the invention, the determination in step 531 is performed in order to ascertain whether the location to which the application instance is attempting to write data is currently in-use. If the location is currently in-use, then the servicing of the application write request may be temporarily paused in (or queued) until the aforementioned location becomes unlocked.

Returning to step 531, if the location is in a locked state, the method waits a predetermined period of time and returns to make the determination after the predetermined period of time. Once it is determined that the location is not in a locked state, the method proceeds to step 532.

In step 532, a determination is made about whether the application is implementing a mirroring policy. In one or more embodiments of the invention, the system control processor consults with a mirroring manager of the system control manager to make such determination. The mirroring manager may specify the application and whether a mirroring policy is to be implemented by such application. If the application is implementing the mirroring policy, the method proceeds to step 534; otherwise, the method proceeds to step 533.

In step 533, following the determination that the application is not implementing a mirroring policy, the application write request is serviced using a storage volume of the composed information handling system. In one or more embodiments of the invention, the application write request is serviced by initiating a locking operation (similar to that discussed below) on the location in the local storage volume. The system control processor, following the locking operation, writes the data to the location, and performs an unlocking mechanism to allow future writes to the location.

In step 534, a locking operation is initiated on the locations associated with the write request in the local storage volume and secondary storage volumes associated with the mirroring policy. In one or more embodiments of the invention, the locking operation includes updating the aforementioned locking data structure to specify the location being in a locked state. Further, the locking operation of step 534 includes sending locking requests to each system control processor of the set (or subset) of composed information handling systems to specify locking the location of the data in which the data is to be written. The corresponding location of each composed information handling system may be associated with a secondary storage volume of the composed information handling system. The specific system control processors to which locking requests are sent is specified in the mirroring policy.

In one or more embodiments of the invention, the locking operations are attempted on both the local storage volume and the secondary storage volumes of the set of composed information handling systems. The attempts of any of the locking operations may fail. In one or more embodiments of the invention, the steps of 535-537 may only be performed if the attempts of the aforementioned locking operations are successful.

In step 535, confirmation of successful lock is obtained from each of a set (or subset) of system control processors associated with the secondary storage volumes. The confirmation may be a message obtained from each system control processor in the set that specifies whether the locking operation was successfully performed in its respective secondary storage volume.

In step 536, servicing of the application write request is initiated in the local storage volumes. In one or more embodiments of the invention, the servicing of the application write request includes writing data to a physical address as specified by the virtual address and the translation table that translates the virtual address.

In step 537, servicing of the application write request in the secondary storage volumes is initiated. In one or more embodiments of the invention, servicing the application write request includes issuing SCP write requests to each system control processor of the set. Each SCP write request specifies writing mirrored data to the corresponding secondary storage volume. The system control processor may obtain a response from each system control processor that specifies whether the SCP write request is successfully serviced.

In step 538, a status of the servicing of all write requests is determined. In one or more embodiments of the invention, the status is determined based on whether all issued messages to the system control processors (either the locking requests or the SCP write requests) result in confirmations from the system control processors of successful servicing. If the system control processor receives a message from any of the system control processors that does not confirm successful servicing, the status may be a failed status. However, if every system control processor confirms successful servicing of both the locking requests and SCP write requests, and the system control processor performs successful servicing of the application write request locally, then the status may be a successful status.

In step 539, a response is issued to the application based on the status. The response may specify the status as determined in step 538. At this point, the unlocking operation may be performed on the locations associated with the write request in the local storage volume and secondary storage volumes. The unlocking operations may result in the locations being unlocked and available for future writes.

FIG. 5.4 shows a flowchart of a method in accordance with one or more embodiments of the invention. The method shown in FIG. 5.4 may be performed by, for example, a system control processor (e.g., 114, FIG. 1.2). Other components of the system in FIGS. 1.1-3 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

Turning to FIG. 5.4,

In step 540, a locking operation on the location associated with the SCP write request in a secondary storage volume. In one or more embodiments of the invention, the locking operation is performed in response to a lock request obtained from the system control processor of FIG. 5.3. The locking operation may include updating a locking data structure managed by the system control processor to specify placing a location of the data specified in the locking request in a locked state.

In step 542, a confirmation of the successful lock is sent based on the result of the locking operation. In one or more embodiments of the invention, the confirmation specifies the successful lock.

In step 544, a SCP write request is obtained for data associated with an application. In one or more embodiments of the invention, the SCP write request is a SCP write request specified in FIG. 5.3. As discussed above, the SCP write request may specify writing mirrored data to a secondary storage volume (e.g., a local storage volume relative to the system control processor performing the method of FIG. 5.3).

In one embodiment of the invention, the SCP write request includes a flag (or other indication) that is to be serviced without performing the steps in FIG. 5.3. Said another way, an SCP may receive write requests from an application instance (i.e., application write requests) and write requests from other SCPs (i.e., SCP write requests). The SCP includes functionality to distinguish between the two types of write requests such that it only performs the method shown in FIG. 5.3 for application write requests and not for SCP write requests.

Continuing with the discussion of FIG. 5.4, in step 546, the SCP write request is serviced using the secondary storage volume. In one or more embodiments of the invention, the servicing of the SCP write request includes writing data to a physical address as specified by the virtual address and a translation table, managed by the system control processor (i.e., the system control processor performing the method shown in FIG. 5.4), used to translate the virtual address.

In one embodiment of the invention, the application write request and the SCP write request specify the same virtual address in which to write the data; however, each of the system control processors may maintain its own translation table that includes its own mapping between virtual address and physical addresses. This enables the system control processor that issued the SCP write request to only perform minimal processing on the application write request to convert it to an SCP write request (e.g., set a flag to indicate that the write request is an SCP write request), the system control processor does not need to perform any translation of the virtual address in the application write request when it is converted to an SCP write request. Moreover, the system control processor that is servicing the SCP write request is able to directly use the virtual address in the SCP write request to perform a lookup in its translation table.

Continuing with the discussion of FIG. 5.4, in step 548, a servicing response is obtained based on the result of the servicing. In one or more embodiments of the invention, the servicing response may specify whether the SCP write request was serviced successfully.

FIG. 5.5 shows a flowchart of a method in accordance with one or more embodiments of the invention. The method shown in FIG. 5.5 may be performed by, for example, a system control processor (e.g., 114, FIG. 1.2). Other components of the system in FIGS. 1.1-3 may perform all, or a portion, of the method of FIG. 5.5 without departing from the invention.

While FIG. 5.5 is illustrated as a series of steps, any of the steps may be omitted, performed in a different order, additional steps may be included, and/or any or all of the steps may be performed in a parallel and/or partially overlapping manner without departing from the invention.

In step 550, a read request for data associated with the application instance is obtained. The read request, sent by an application instance of the application executing on the composed information handling system of the system control processor, may specify a location of the data associated with the application.

In step 552, a reading of the data is initiated using the local storage volume of the composed information handling system. In one or more embodiments of the invention, the data is read by identifying the location of the data, converting (if applicable) the location to a physical storage address in which the data is stored, and generating a copy to be provided to the application sending the read request.

In one embodiment of the invention, each application instance of the cluster application shares a virtual address space. As a result, any application instance may read data that is stored in its local storage volume regardless of which application instance initiated the writing of the data to the local store volume. For example, application instance A may have stored a copy of datum X locally in its composed information handling system (i.e., composed information handling system A) and initiated storage of another copy of datum X in composed information handling system B. The application instance B executing on composed information handling system B may perform the method shown in FIG. 5.5 to read the copy of datum X from the local storage volume in composed information handling system B.

FIG. 5.6 shows a flowchart of a method in accordance with one or more embodiments of the invention. The method shown in FIG. 5.6 may be performed by, for example, a system control processor manager (e.g., 50, FIG. 1.1). Other components of the system in FIGS. 1.1-3 may perform all, or a portion, of the method of FIG. 5.6 without departing from the invention.

While FIG. 5.6 is illustrated as a series of steps, any of the steps may be omitted, performed in a different order, additional steps may be included, and/or any or all of the steps may be performed in a parallel and/or partially overlapping manner without departing from the invention.

In step 560, a volume migration request is obtained for data in a storage volume. In one or more embodiments of the invention, the volume migration request specifies performing a data migration of data between storage volumes in a composed information handling system. The data may be migrated from a first storage volume (also referred to as a source storage volume) to a second storage volume (also referred to as the target storage volume). The source storage volume and the target storage volumes may be physical storage devices or virtualized without departing from the invention.

In step 562, a source storage volume from which the data is to be migrated is identified. In one or more embodiments of the invention, the source storage volume is specified in the volume migration request. In such embodiments where the source storage volume is not specified in the migration request, the source storage volume may be identified by the system control processor manager by using the telemetry data map that specifies the storage volumes in the composed information handling system and identifies which storage volume is active (i.e., where data is regularly being written to and/or read from), and identifies such storage volume as the source storage volume.

In step 564, a target storage volume in which to store the data is identified. In one or more embodiments, the target storage volume is specified in the volume migration request. In such embodiments in which the target storage volume is not specified, the system control processor manager may identify the target storage volume by determining a second storage volume in which there is available storage space to store the data transferred from the source storage volume.

In step 566, a data migration of the data from the identified source storage volume to the identified target volume is initiated. In one or more embodiments of the invention, the data migration is initiated by sending a message to a system control processor that specifies transferring the data from the identified source storage volume to the identified target storage volume.

In one or more embodiments of the invention, during the data migration, one or more security policies may be implemented to ensure protection of the access to the data. A security policy may specify, for example, whether to encrypt or decrypt the data prior to the migration, and/or whether to decrypt the data after migration or to place the data in an encrypted state. The implementation of such security policies may be specified in the migration request.

In one or more embodiments of the invention, such security policies implemented during the data migration may become transparent to the application instance utilizing the data. For example, the system control processor manager may send a notification to the system control processor manager that specifies the security policies implemented during the data migration. In this manner, the application instance of the composed information handling system may continue the implementation of the security policies while initiating read requests or write requests. For example, if a security policy specifies performing an encryption algorithm on the data prior to the data migration, then any write requests initiated by the application instance may include performing an encryption to the data of the write request prior to storage in the corresponding storage volume.

FIG. 5.7 shows a flowchart of a method in accordance with one or more embodiments of the invention. The method shown in FIG. 5.7 may be performed by, for example, a system control processor (e.g., 114, FIG. 1.2). Other components of the system in FIGS. 1.1-3 may perform all, or a portion, of the method of FIG. 5.7 without departing from the invention.

While FIG. 5.7 is illustrated as a series of steps, any of the steps may be omitted, performed in a different order, additional steps may be included, and/or any or all of the steps may be performed in a parallel and/or partially overlapping manner without departing from the invention.

In step 570, a write request for data originally stored in the source storage volume is obtained. In one or more embodiments of the invention, the write request is obtained from a component of a compute resource set in the composed information handling system. The write request may specify writing data originally stored in the source storage volume. For example, an application (which may or may not be an application instance) executing in the compute resource set may issue the write request.

In step 572, the data migration of the source storage volume is monitored to identify a state of the data in the data migration. In one or more embodiments of the invention, the monitoring includes determining which locations (virtual or otherwise) of the source storage volume has been processed for the data transfer (e.g., whether the data in each location has been transferred to the target volume). The status may be a data structure that specifies each location in the source storage volume and whether the data in the location has been transferred.

In step 574, a determination is made about whether the data is associated with transferred data in the data migration. The determination includes identifying the location associated with the write request, and identifying whether the data originally stored in the location has been transferred. If the data is transferred during the data migration, the method proceeds to step 576; otherwise the method proceeds to step 578.

In step 576, the write request is serviced using the target storage volume. In one or more embodiments of the invention, the write request is serviced by identifying a physical address associated with the location of the data in the target volume, and writing the data to the physical address. The location in the target storage volume is identified using a mapping data structure maintained by the system control processor that maps the locations of the source storage volume to locations of the target storage volume.

In step 578, the write request is serviced using the source target volume. In one or more embodiments of the invention, similar to step 576, the write request is serviced by identifying a physical address associated with the location of the data in the source volume, and writing the data to the physical address of the source volume.

FIG. 5.8 shows a flowchart of a method in accordance with one or more embodiments of the invention. The method shown in FIG. 5.8 may be performed by, for example, a system control processor (e.g., 114, FIG. 1.2). Other components of the system in FIGS. 1.1-3 may perform all, or a portion, of the method of FIG. 5.8 without departing from the invention.

While FIG. 5.8 is illustrated as a series of steps, any of the steps may be omitted, performed in a different order, additional steps may be included, and/or any or all of the steps may be performed in a parallel and/or partially overlapping manner without departing from the invention.

In step 580, a read request for data originally stored in the source storage volume is obtained. In one or more embodiments of the invention, the read request is obtained from a component of a compute resource set in the composed information handling system. The read request may specify reading (or otherwise obtaining) data originally stored in the source storage volume.

In step 582, the data migration of the source storage volume is monitored to identify a state of the data in the data migration. In one or more embodiments of the invention, the data migration is monitored similar to the monitoring performed in step 572 of FIG. 5.7.

In step 584, a determination is made about whether the data is associated with transferred data in the data migration. Similar to step 574 of FIG. 5.7, the determination includes identifying the location associated with the read request, and identifying whether the data originally stored in the location has been transferred. If the data has been transferred during the data migration, the method proceeds to step 586; otherwise the method proceeds to step 588.

In step 586, the data specified in the read request is obtained using the target storage volume. In one or more embodiments of the invention, the read request is serviced by identifying a physical address associated with the location of the data in the source storage volume, and copying the data to be provided to the compute resource set.

In step 588, the data specified in the read request is obtained using the source target volume. In one or more embodiments of the invention, similar to step 586, the read request is serviced by identifying a physical address associated with the location of the data in the target storage volume, and copying the data to be provided to the compute resource set.

EXAMPLE

The following section describes an example in accordance with one or more embodiments of the invention. The example is not intended to limit the scope of the invention.

Turning to the example, consider a scenario as illustrated in FIG. 6.1, in which a client (602), at step 1, sends an application mirroring request to a system control processor manager (600) that manages two information handling systems (IHSs) (610, 620). The application mirroring request specifies that an application instance of a cluster application executing on IHS A (610) is to mirror application data stored in local storage volume A (616) of IHS A (610) to a second storage volume.

In response to the application mirroring request, the system control processor manager (600), at step 2, identifies that IHS B (620) includes a compute resource set B (622) that executes the application instance. System control processor manager (600), at step 3, sends mirroring policy implementation requests to system control processors (614, 624) of IHS A (610) and IHS B (620). At step 4, the system control processors (624, 624) update the corresponding mirroring managers (not shown) to implement mirroring policies that specify mirroring between local storage volumes A (616) and B (626).

As seen in FIG. 6.2, at step 5, the compute resource set A (612), sends an application write request (not shown). In this example, a first composed information handling system includes compute resource set A (612) and a local storage volume A (616), and a second composed information handling system includes compute resource set B (632) and local storage volume C (636). Each composed information handling system executes an application instance discussed throughout the example. The application write request specifies storing data associated with the application instance. At step 6, the system control processor (614) obtains the write request. At step 7, the system control processor (614), in response to the write requests, determines that the application write request corresponds to an application instance for which a mirroring policy is to be implemented.

At step 8, the system control processor (614) sends a locking request to the system control processor (624) of IHS B (620) to determine whether the location associated with the application write request is locked. At step 9, the system control processor (624) of IHS B (620) sends a response stating the location is not locked. At step 10, the system control processor (614) of IHS A (610) receives the response. Based on the response, the system control processor (614) initiates a lock on the location for storage volume A (616). At step 12, a lock request is sent to the system control processor (624) of IHS B (620) to initiate locking on the location at local storage volume B (626).

At step 13, the data is written locally in accordance with the application write request. At step 14, an SCP write request is obtained by the system control processor (624) to be written in local storage volume B (626). The SCP write request specifies writing the data to local storage volume B (626). At step 15, the mirrored data is written to the local storage volume B (626) in accordance with the SCP write request. After the data is written to both storage volumes (616, 626), the locations to which that data was written are locked on both storage volumes after confirmation is received that both system control processors (614, 624) have written the data in the corresponding storage volumes (616, 626). After successful servicing of the application write request and the SCP write request, the system control processor (614) of IHS A (610) sends a confirmation to the application instance executing in compute resource set A (612) that specifies successful servicing of the application write request.

At a step 16, the client sends a data migration request to migrate data from local storage volume A (616) to a second storage volume. At step 17, the system control processor manager (600) obtains the data migration request to identify an available target storage volume that is capable of storing the data in local storage volume A (616). The system control processor (600) using a telemetry data map that specifies composed information handling systems, determines that a storage volume (i.e., 636) in IHS C (630), which is part of a third composed information handling system, includes such capabilities.

At step 18, the system control processor manager (600) initiates a data migration by sending a data migration initiation request to the system control processor (614) of IHS (610) to perform the data migration.

At step 19, the system control processor (614) of IHS A (610) receives the data migration initiation request. In response to the data migration initiation request, in step 20, the system control processor obtains the data from local storage volume A (616). At step 21, the data is sent from the local storage volume (616). At step 22, the data is transferred to the system control processor (634). At step 23, the system control processor (634) of IHS B (634) obtains the data. At step 24, the system control processor (634) stores the data in local storage volume C (636).

During the data migration performed in steps 20-24, a security policy may be implemented that specifies that, prior to the data migrating from local storage volume A (616) to local storage volume C (636) across the network (130), for an encryption algorithm to be implemented on each portion of the data being migrated. The security policy may further include decrypting the data by the system control processor of IHS C (630) prior to storage.

Additionally, during the data migration, data associated with the application instance may be read from or written to using compute resource set A (612). The system control processor (614), while monitoring the data migration, may determine whether the data has been transferred or not to determine from where to read the data and/or to where to write the data.

End of Example

Thus, as illustrated in FIGS. 6.1-6.5, embodiments of the invention may provide a system that enables improved computer implemented services to be provided using dynamically instantiated composed information handling systems via efficient computing resource allocation.

Figure 7:
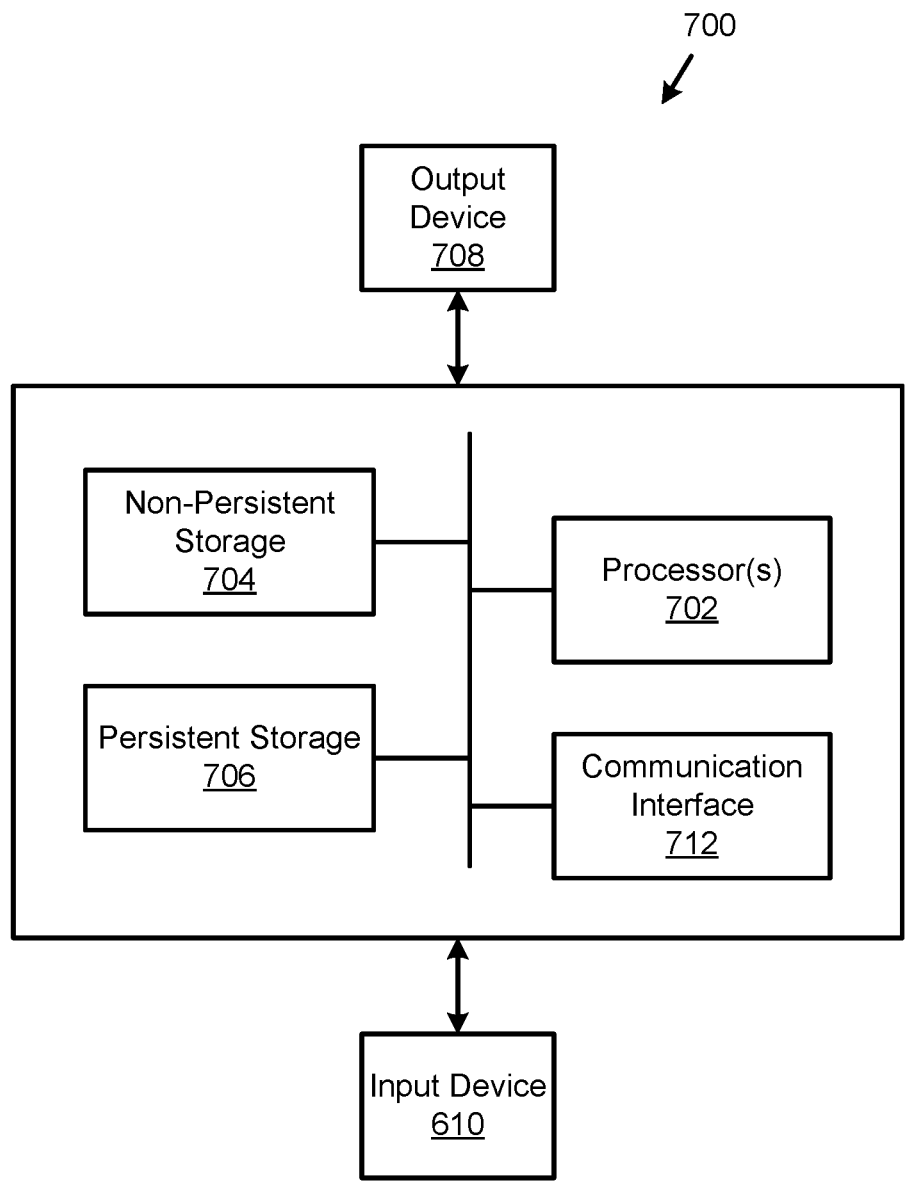
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for managing data generated by multiple application instances of an application. Embodiments of the invention enable multiple storage volumes to store mirrored data of a cluster application. In this manner, efficient implementation of application consistency may be maintained between storage volumes of multiple composed information handling systems.

Further, embodiments of the invention include performing efficient data migration between storage volumes in a composed information handling system. Embodiments of the invention enable the composed information handling systems to continue operation by enabling a system control processor of the composed information handling system to service read and write requests during the data migration. In this manner, the data migration does not negatively impact the operation of additional components in the composed information handling system (e.g., compute resource sets issuing the read and write requests).

Thus, embodiments of the invention may address the problem of resource allocation for composed systems. For example, by utilizing a system control processor manager, the limited resources of multiple information handling systems may be efficiently allocated to provide desired computer implemented services.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for providing computer implemented services using information handling systems, comprising:
   a composed information handling system comprising a system control processor (SCP) and that provides, at least in part, the computer implemented services, wherein the computer implemented services comprises executing a first application instance of a cluster application;
   wherein the system control processor programmed to:
   receive a mirroring policy from a system control processor manager;
   receive an application write request from the first application instance;
   based on the application write request and the mirroring policy:
   perform a locking operation on a first location on a first storage device of the composed information handling system,
   wherein the locking operation comprises:
      updating a locking data structure to specify the first location as being in a locked state;
      initiating, based on the mirroring policy, a second locking operation on a second location on a second storage device of a second composed information handling system,
      wherein initiating the second locking operation comprises sending a locking request to a second system control processor managing the second storage device, wherein the locking request specifies updating a second locking data structure to specify a locked state of the second location;
   initiate servicing of the application write request by the composed information handling system;
   initiate servicing of an SCP write request by the second composed information handling system, wherein the SCP write request is based on the application write request;
   receive a SCP response from the SCP write request from the second system control processor, wherein the second composed information handling system comprises the second system control processor and is executing a second application instance of the cluster application; and
   send a write response to the first application instance, wherein the write response is based, at least in part, on the SCP response.

2. The system of claim 1, wherein the write response only specifies that the servicing of the application write request was successful when both the servicing of the application write request and the SCP write request are successful.

3. The system of claim 1, wherein the composed information handling system comprises a compute resource set, a hardware resource set, and a control resource set comprising the system control processor.

4. The system of claim 3, wherein the control resource set presents abstracted computing resources of the hardware resource set as bare metal resources to the compute resource set.

5. The system of claim 1, wherein the second composed information handling system receives the mirroring policy from the system control processor manager prior to receiving the SCP write request.

6. The system of claim 1, further comprising:
   the system control processor manager, wherein the system control processor manager is programmed to:
      obtain an application mirroring request from a client;
      identify, in response to the application mirroring request, the composed information handling system and the second composed information handling system; and
      send, based on the identifying, the mirroring policy to the first composed information handling system and the second composed information handling system.

7. The system of claim 1, wherein the system control processor further is programmed to:
   select a source volume to migrate, wherein the composed information handling system comprises the source volume, wherein the source volume comprises data associated with the first application instance;
   select a target volume, wherein the composed information handling system comprises the target volume; and
   initiate migration of data on the source volume to the target volume, wherein the migration is performed in a manner that is transparent to the first application instance.

8. The system of claim 7, wherein the system control processor manager is further programmed to:
   identify the target volume on a second information handling system; and
   instruct the system control processor to add the target volume to the composed information handling system, wherein a first information handling system comprises the system control processor.

9. A method for providing computer implemented services using information handling systems, comprising:
   receiving, by a system control processor (SCP), a mirroring policy from a system control processor manager;

receiving an application write request from a first application instance;

based on the application write request and the mirroring policy:

performing a locking operation on a first location on a first storage device of a composed information handling system, wherein the locking operation comprises:

updating a locking data structure to specify the first location as being in a locked state;

initiating, based on the mirroring policy, a second locking operation on a second location on a second storage device of a second composed information handling system, wherein initiating the second locking operation comprises sending a locking request to a second system control processor managing the second storage device, wherein the locking request specifies updating a second locking data structure to specify a locked state of the second location;

initiating servicing of the application write request by the composed information handling system;

initiating servicing of an SCP write request by the second composed information handling system, wherein the SCP write request is based on the application write request, wherein the composed information handling system comprises the system control processor and provides the computer implemented services, and wherein the computer implemented services comprises executing the first application instance of a cluster application;

receiving an SCP response from the SCP write request from a second system control processor, wherein the second composed information handling system comprises the second system control processor and is executing a second application instance of the cluster application; and sending a write response to the first application instance, wherein the write response is based, at least in part, on the SCP response.

10. The method of claim 9, wherein the write response only specifies that the servicing of the application write request was successful when both the servicing of the application write request and the SCP write request are successful.

11. The method of claim 9, wherein the composed information handling system comprises a compute resource set, a hardware resource set, and a control resource set comprising the system control processor.

12. The method of claim 11, wherein the control resource set presents abstracted computing resources of the hardware resource set as bare metal resources to the compute resource set.

13. The method of claim 9, wherein the second composed information handling system receives the mirroring policy from the system control processor manager prior to receiving the SCP write request.

14. The method of claim 9, wherein the system control processor manager is programmed to:

obtain an application mirroring request from a client;

identify, in response to the application mirroring request, the composed information handling system and the second composed information handling system; and send, based on the identifying, the mirroring policy to the composed information handling system and the second composed information handling system.

15. The method of claim 14, further comprising:

selecting a source volume to migrate, wherein the composed information handling system comprises the source volume, wherein the source volume comprises data associated with the first application instance;

selecting a target volume, wherein the composed information handling system comprises the target volume; and initiating migration of data on the source volume to the target volume, wherein the migration is performed in a manner that is transparent to the first application instance.

16. The method of claim 15, wherein the system control processor manager is further programmed to:

identify the target volume on a second information handling system; and instruct the system control processor to add the target volume to the composed information handling system, wherein a first information handling system comprises the system control processor.

17. A non-transitory computer readable medium comprising computer readable program code, which when executed by a computer processor enables the computer processor to perform a method for dynamically instantiating composed information handling systems, the method comprising:

receiving a mirroring policy;

receiving an application write request from a first application instance; based on the application write request and the mirroring policy:

performing a locking operation on a first location on a first storage device of a composed information handling system, wherein the locking operation comprises:

updating a locking data structure to specify the first location as being in a locked state;

initiating, based on the mirroring policy, a second locking operation on a second location on a second storage device of a second composed information handling system, wherein initiating the second locking operation comprises sending a locking request to a second system control processor managing the second storage device, wherein the locking request specifies updating a second locking data structure to specify a locked state of the second location;

initiating servicing of the application write request;

initiating servicing of a system control processor (SCP) write request by the second composed information handling system, wherein the SCP write request is based on the application write request, wherein the composed information handling system comprises the system control processor and provides the computer implemented services, and wherein the computer implemented services comprises executing the first application instance of a cluster application;

receiving an SCP response from the SCP write request from a second system control processor, wherein the second composed information handling system comprises the second system control processor and is executing a second application instance of the cluster application;

sending a write response to the first application instance, wherein the write response is based, at least in part, on the SCP response.

* * * * *